(12) United States Patent
Favaretto

(10) Patent No.: US 11,117,625 B2
(45) Date of Patent: Sep. 14, 2021

(54) ELECTRIC OR HYBRID SPORT CAR

(71) Applicant: FERRARI S.p.A., Modena (IT)

(72) Inventor: Fabrizio Favaretto, Formigine (IT)

(73) Assignee: FERRARI S.p.A., Modena (IT)

( * ) Notice: Subject to any disclaimer, the term of this patent is extended or adjusted under 35 U.S.C. 154(b) by 79 days.

(21) Appl. No.: 16/724,653

(22) Filed: Dec. 23, 2019

(65) Prior Publication Data
US 2020/0207424 A1 Jul. 2, 2020

(30) Foreign Application Priority Data

Dec. 27, 2018 (IT) .................. 102018000021199

(51) Int. Cl.
| | |
|---|---|
| *B60J 7/00* | (2006.01) |
| *B62D 25/20* | (2006.01) |
| *B60K 1/04* | (2019.01) |
| *B62D 21/02* | (2006.01) |
| *B62D 21/06* | (2006.01) |
| *B62D 21/11* | (2006.01) |

(Continued)

(52) U.S. Cl.
CPC ............ *B62D 25/2027* (2013.01); *B60K 1/04* (2013.01); *B62D 21/02* (2013.01); *B62D 21/06* (2013.01); *B62D 21/11* (2013.01); *B62D 25/08* (2013.01); *B62D 29/041* (2013.01); *B60K 2001/0416* (2013.01)

(58) Field of Classification Search
CPC ....... B60K 1/04; B62B 7/008; A63B 22/0023; A63B 22/02; A63H 3/20; B60P 3/08; G07B 15/063; B62D 1/28; G01S 13/931; G01C 21/28

See application file for complete search history.

(56) References Cited

U.S. PATENT DOCUMENTS

2012/0129029 A1  5/2012 Yi et al.
2013/0119757 A1*  5/2013 Tachikawa ............... B60K 1/04
                                                                   307/9.1

(Continued)

FOREIGN PATENT DOCUMENTS

DE  102013218038 A1  3/2015
DE  112013005203 T5  8/2015

(Continued)

OTHER PUBLICATIONS

Search Report and Written Opinion for IT Application No. 201800021199 dated Sep. 2, 2019, 8 pages.

*Primary Examiner* — Kiran B Patel
(74) *Attorney, Agent, or Firm* — Cantor Colburn LLP

(57) ABSTRACT

An electric or hybrid sport car comprising a vehicular frame and a floor formed by a fixed portion with the vehicular frame and a removable base and wherein a bottom part of the base consists of a so-called platform, which consists of a plate made of metal or high-resistance composite material, exposed to the outside so as to operatively face the ground on which the car rests. A rear part of the platform diverges from the ground proceeding towards a rear part of the car, and wherein said rear part of the platform supports a support frame of a rear battery pack, and wherein said support frame comprises a plurality of support layers for as many battery layers, which include columns operatively vertical and structures parallel to the rear portion of the platform.

12 Claims, 14 Drawing Sheets

(51) Int. Cl.
*B62D 25/08* (2006.01)
*B62D 29/04* (2006.01)

(56) References Cited

U.S. PATENT DOCUMENTS

| | | | | |
|---|---|---|---|---|
| 2013/0122338 | A1* | 5/2013 | Katayama | H01M 10/6563 |
| | | | | 429/83 |
| 2014/0338998 | A1* | 11/2014 | Fujii | H01M 10/625 |
| | | | | 180/68.5 |
| 2014/0374180 | A1* | 12/2014 | Katayama | B60L 50/66 |
| | | | | 180/68.5 |
| 2016/0226041 | A1* | 8/2016 | Jackson | H01M 50/20 |
| 2017/0106735 | A1 | 4/2017 | Mitani et al. | |
| 2018/0126857 | A1* | 5/2018 | Kelly-Morgan | C08L 33/10 |
| 2018/0251102 | A1* | 9/2018 | Han | H01M 50/20 |
| 2018/0337377 | A1* | 11/2018 | Stephens | B60L 50/64 |
| 2019/0061506 | A1* | 2/2019 | Kappich | B60K 1/04 |
| 2019/0210470 | A1* | 7/2019 | Thomas | B62D 21/10 |
| 2019/0237724 | A1* | 8/2019 | Kawaguchi | B60L 50/66 |
| 2019/0296298 | A1* | 9/2019 | Watanabe | B60L 50/64 |
| 2019/0312320 | A1* | 10/2019 | Uchiyama | H01M 50/20 |
| 2020/0070671 | A1* | 3/2020 | Ohkuma | B60L 50/66 |
| 2020/0119321 | A1* | 4/2020 | Hirose | H01M 10/6554 |
| 2020/0180417 | A1* | 6/2020 | Marquez Duran | H01M 10/625 |
| 2020/0215895 | A1* | 7/2020 | Tanaka | B60L 50/64 |
| 2020/0227706 | A1* | 7/2020 | Kuno | H01M 50/20 |
| 2020/0365850 | A1* | 11/2020 | Shinoda | H01M 10/48 |
| 2020/0369140 | A1* | 11/2020 | McCarron | B60K 17/06 |
| 2021/0061080 | A1* | 3/2021 | Otoguro | B62D 21/03 |
| 2021/0101464 | A1* | 4/2021 | Matsushima | B60N 2/005 |
| 2021/0122223 | A1* | 4/2021 | McCarron | B60K 17/06 |

FOREIGN PATENT DOCUMENTS

| | | |
|---|---|---|
| DE | 102015213860 A1 | 1/2017 |
| DE | 102018000922 A1 | 8/2018 |
| EP | 3323652 A1 | 5/2018 |
| FR | 2942763 A1 | 9/2010 |
| GB | 2561363 A | 10/2018 |
| WO | 2012028929 A1 | 3/2012 |
| WO | 2016151181 A1 | 9/2016 |

* cited by examiner

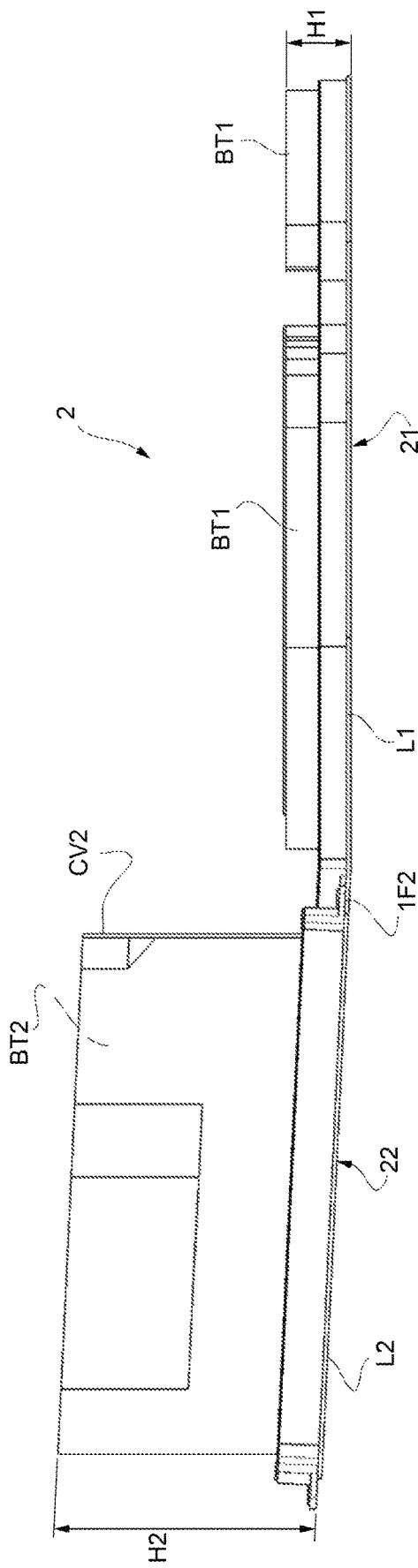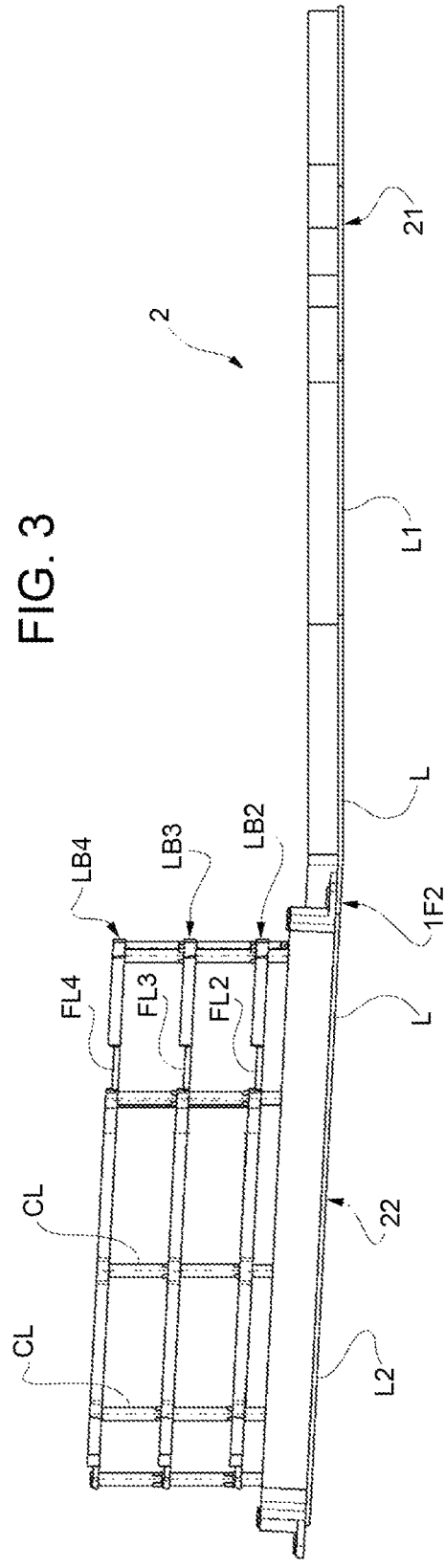

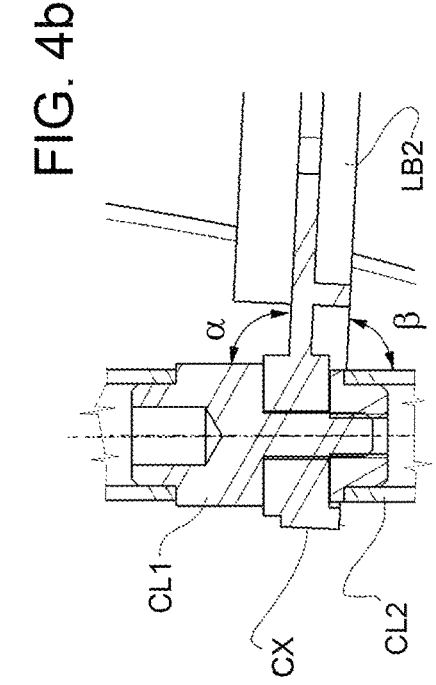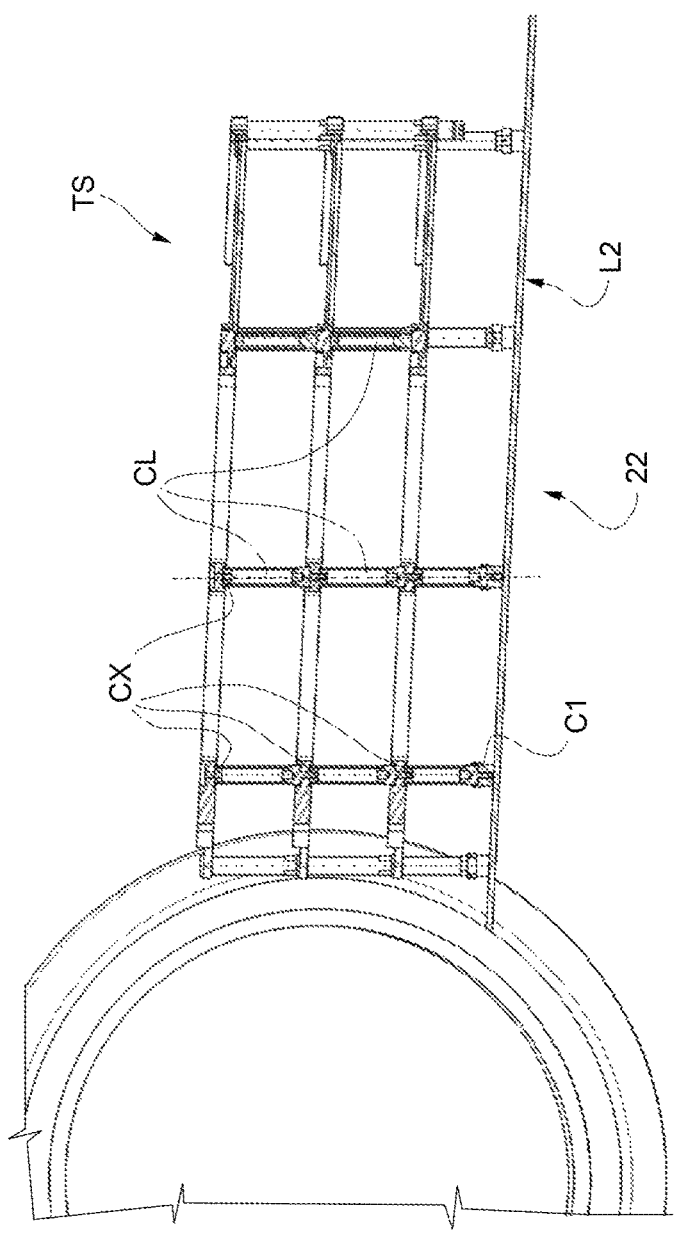

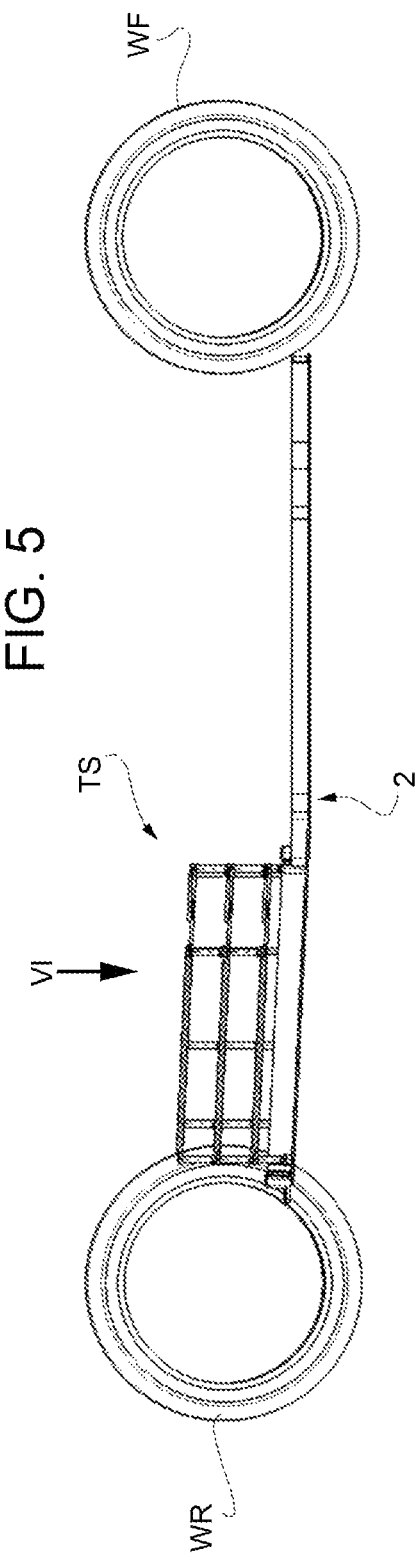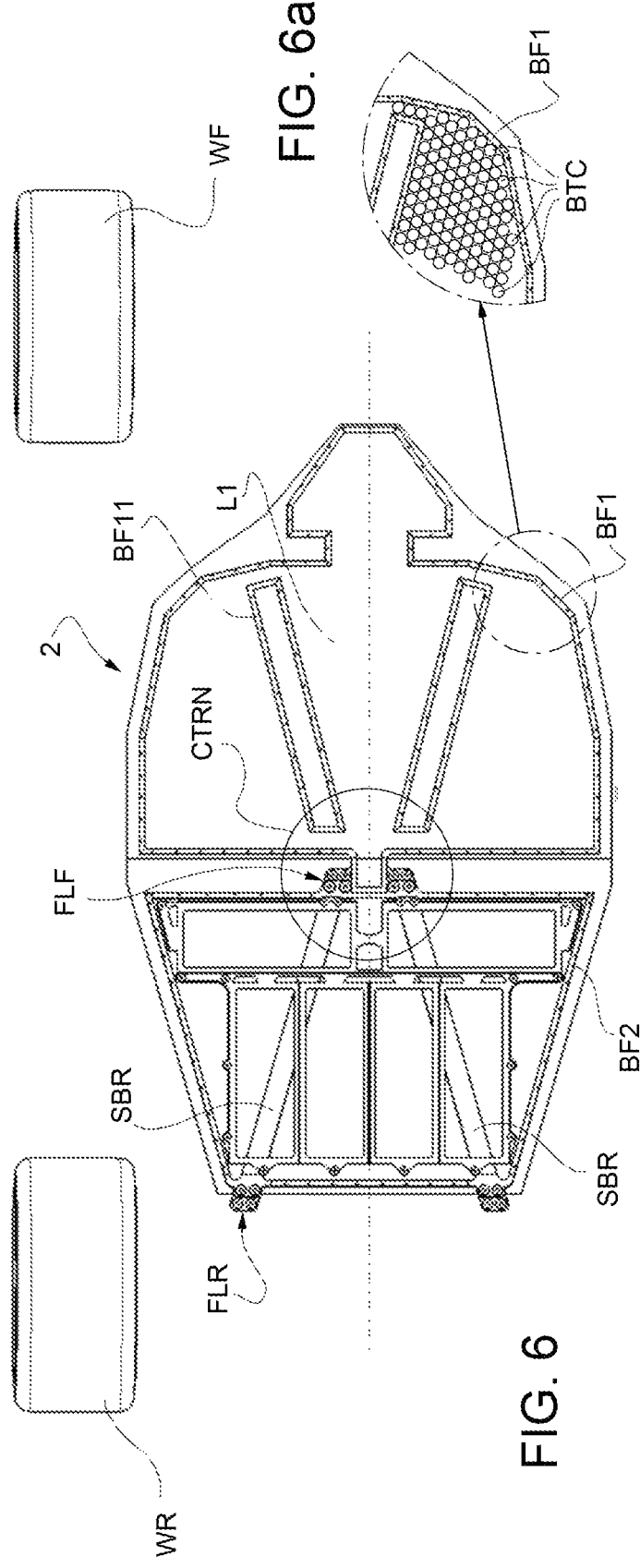

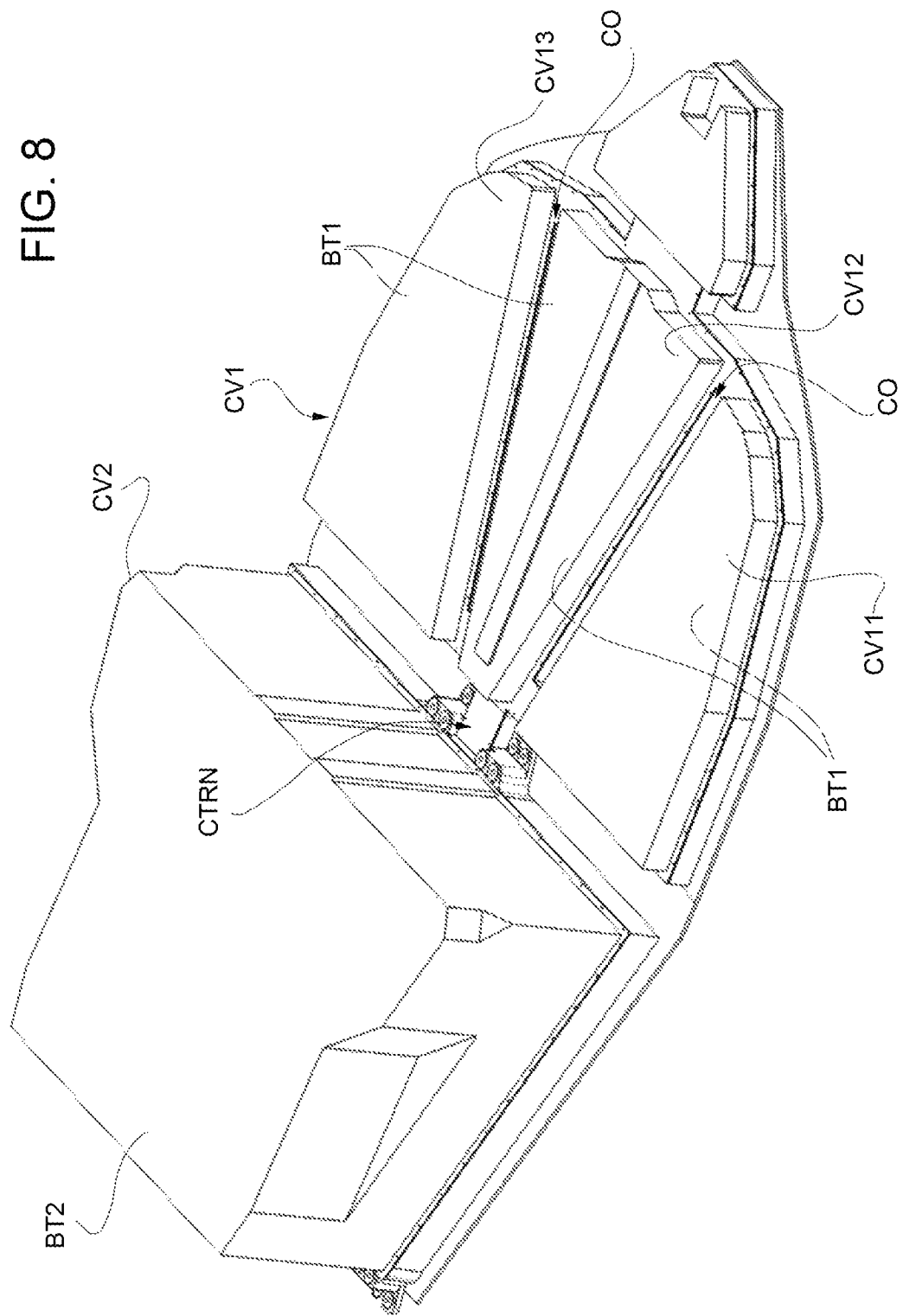

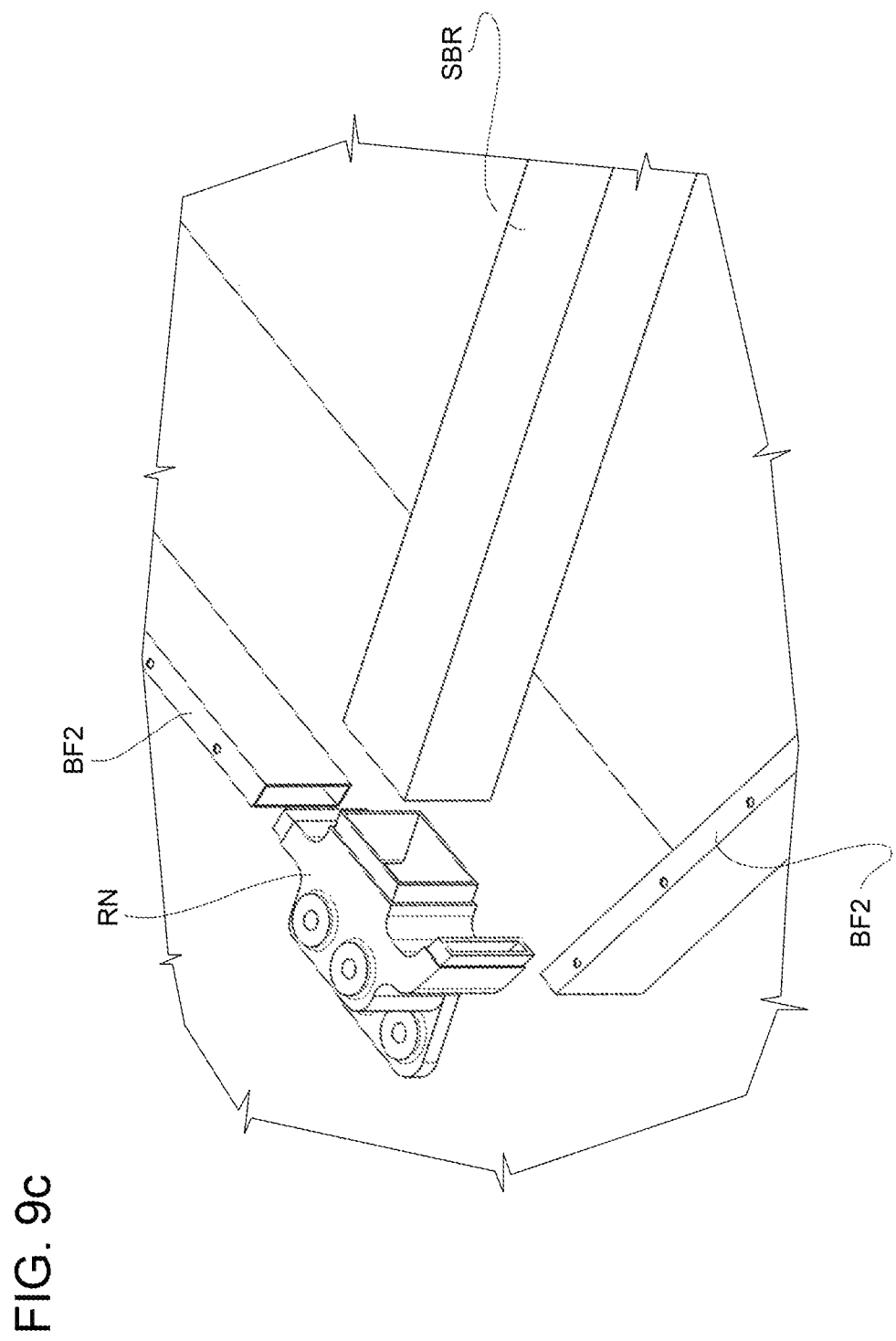

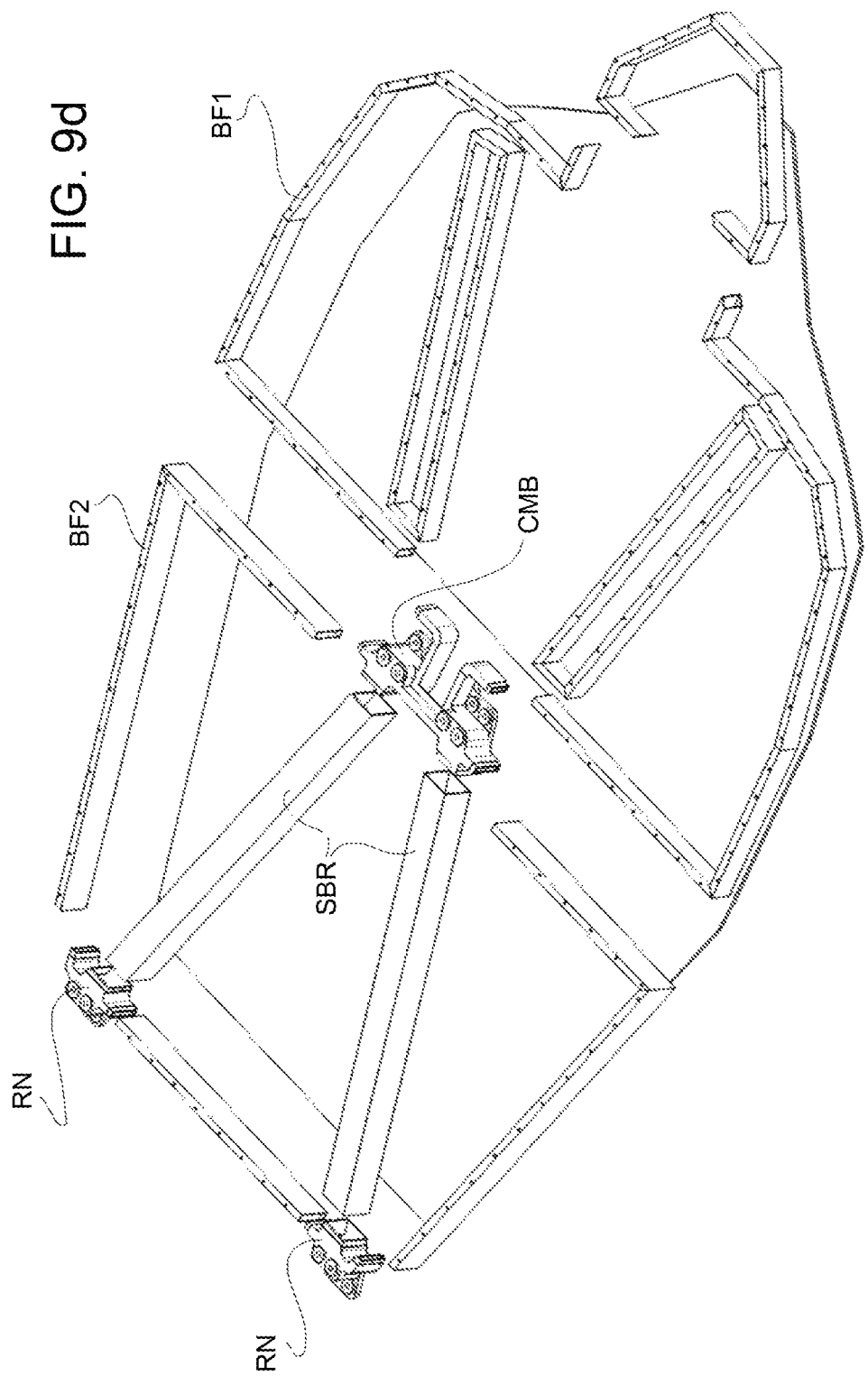

ELECTRIC OR HYBRID SPORT CAR

CROSS-REFERENCE TO RELATED APPLICATIONS

This patent application claims priority from Italian patent application no. 102018000021199 filed on Dec. 27, 2018, the entire disclosure of which is incorporated herein by reference.

TECHNICAL FIELD OF THE INVENTION

The invention relates to an electric or hybrid sports cars and, in particular, to a system used to anchor a vehicle battery pack to a platform of the car.

STATE OF THE ART

The most commonly used batteries are cylindrical batteries, prismatic batteries and pouch batteries. They must be grouped together, electrically connected to one another and associated with the vehicle in a stable manner.

The mechanical connection of the battery packs is a relevant problem, since, in case of impact, the mechanical structures supporting the battery packs cannot yield, thus representing a risk for the occupants of the vehicle.

These structures are generally anchored to the floor of the vehicle. In some cases, the batteries are housed in the floor itself; in other cases, they are arranged in the place normally occupied by the traditional heat engine assembly.

In a sports car, for example with two mere seats, the batteries can be housed behind the two seats.

Sports cars, which need to deliver very high performances, are required to have a conformation of the platform of the vehicle frame that is such as to fulfil predetermined aerodynamic requirements. This clashes with the installation of the aforesaid battery pack.

If not specifically excluded by the detailed description below, the information contained in this part should be considered as an integral part of the detailed description itself.

Document DE 102015213860 describes an arrangement of batteries in an electric drive vehicle with a battery compartment delimited by an underbody of the vehicle open on the lower side and divided into a main compartment and at least one sub-compartment.

Document DE 102018000922 describes a car having at least one underbody element deformed in a longitudinal direction.

Document DE 112013005203 describes an electric vehicle, in which at least part of a battery is arranged along an inclined dividing part at the back of the passengers' seats.

Document DE 102013218038 describes a battery compartment for a drive battery of a vehicle that is at least partially electrically operated. The compartment has a reinforcement structure.

SUMMARY OF THE INVENTION

The object of the invention is to provide an electric or hybrid sports vehicle provided with a platform shaped like an extractor and with a support frame for anchoring the batteries, which is designed to be connected to the aforesaid platform.

When a platform is not horizontal, but is shaped so as to extract an air flow between the ground and the platform of the car, the platform is raised in the rear part so as to generate a negative lift in the rear part of the vehicle.

The idea on which the invention is based is that of anchoring a battery pack support frame to a portion of the inclined platform, so that the support columns between the different battery module support structures remain perfectly vertical, whereas the different battery pack support structures remain parallel to the platform.

Advantageously, the fact that the battery packs are stacked together parallel to the platform allows for an ideal exchange of heat with the platform and, at the same time, the structural stiffness remains unchanged, with the columns remaining perfectly vertical despite a non-horizontal platform.

The dependant claims describe preferred embodiments of the invention, thus forming an integral part of the description.

BRIEF DESCRIPTION OF THE FIGURES

Further objects and advantages of the invention will be best understood upon perusal of the following detailed description of an embodiment thereof (and of relative variants) with reference to the accompanying drawings merely showing non-limiting examples, wherein:

FIGS. 2 and 3 show side views of the floor of FIG. 1, wherein FIG. 2 shows covers of the battery packs, whereas FIG. 3 shows a support frame for a battery pack consisting of different layers, housed behind the seats of the cabin of the car;

FIG. 4 shows a detail of the support frame of FIG. 3 with reference to a rear wheel of the vehicle and FIGS. 4a and 4b show constructive details of the support frame;

FIGS. 5 and 6 show a side view and a view from the top, respectively, of the floor of FIG. 3;

FIG. 6a shows a detail of FIG. 6 in which cylindrical chemical batteries are housed, so as to obtain the maximum filling of the space available in the floor of the car;

FIG. 8 shows a perspective view of the floor provided with covers of the battery packs as shown in FIG. 2;

FIGS. 9a-9c show manufacturing details of the floor according to the preceding figures and FIG. 9d shows an exploded view of a portion of the floor according to the preceding figures;

FIG. 11 shows a perspective view from the top of the car in the condition of FIG. 10, whereas

In the figures, the same numbers and the same reference letters indicate the same elements or components.

For the purposes of the invention, the term "second" component does not imply the presence of a "first" component. As a matter of fact, these terms are only used as labels to improve clarity and should not be interpreted in a limiting manner.

The elements and features contained in the different preferred embodiments, drawings included, can be combined with one another, without for this reason going beyond the scope of protection of this patent application, as described hereinafter.

DETAILED DESCRIPTION OF EMBODIMENTS

Figure 1:
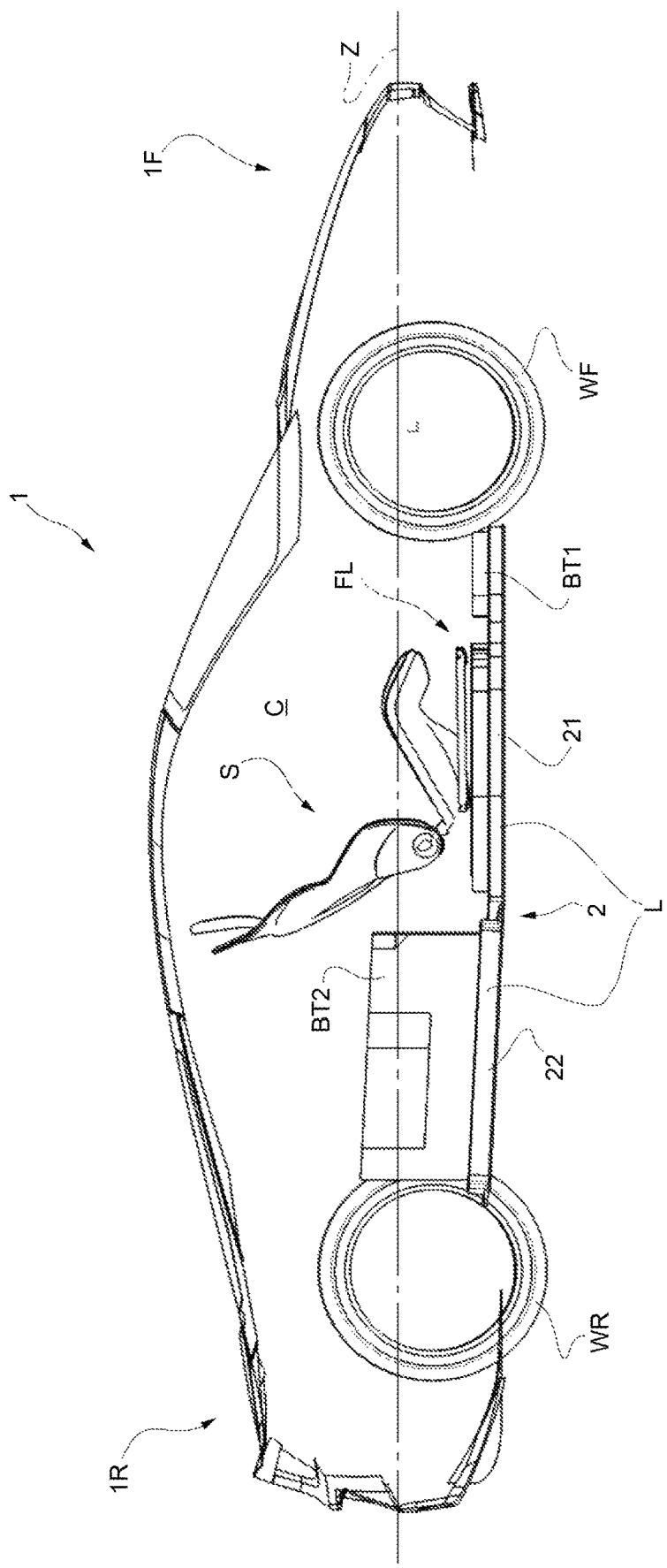
FIG. 1 shows a side view of a sports motor vehicle with transparent portions of the body, highlighting a floor in which and/or to which battery packs are anchored.

FIG. 1 shows an electric or hybrid car 1 in a side view and with transparent parts. The front part 1F of the car is arranged on the right side of the sheet, opposite the rear part 1R, according to the longitudinal development Z of the car.

Therefore, the front wheels WF of the front axle and the rear wheels WR of the rear axle can be identified. The floor FL of the car approximately extends between the front axle and the rear axle.

The floor comprises a removable base 2 and a fixed portion, which is an integral part of the frame of the car. Hereinafter, in order not to generate confusion, by base 2 we mean the removable portion of the floor and by "floor of the frame" we mean the fixed portion of the floor which cannot be removed from the floor.

The base 2 comprises a front part 21 and a rear part 22.

The front part 21 supports, on top, the seats S accommodating the occupants of the car.

The base 2 of the car 1 houses electric batteries (which are not shown herein).

FIGS. 2 and 3 show, in detail, the base 2 of the car removed from the remaining body of the car.

The rear part 22 of the base support a rear battery pack BT2 having a height which is significantly greater than the height or thickness H of the battery pack BT1 integrated in the front part 21 of the base 2. This is due to the fact that the front part of the base is under the cabin C, where the vital space of the occupants of the vehicle is obtained and where the relative seats S are housed.

Even though the appended figures do not show any heat engine, it can be housed in the front part of the car or behind the rear battery pack BT2, thus defining a configuration in which the rear battery pack is interposed between the heat engine and the seats of the car.

The rear part 22 of the base, on the other hand, can project upwards. This leads to the creation of different structural support structures LB1, LB2 and LB3 supporting the same number of layers of electric batteries (which are not shown).

The lower part of the base consists of a so-called platform L, which consists of a plate made of metal or of a high-resistance composite material. The platform is exposed to the outside and faces the ground on which the car lies.

Preferably, the platform L of the car is not flat. The front part L1 is substantially flat. The rear part L2 is substantially flat, but in the area of interface 1F2 between the two parts L1 and L2 there is a corner, which is also indicated with symbol 1F2 and extends crosswise to the longitudinal development Z.

The fact that there is a smaller or greater corner is evidently irrelevant for the purposes of the description.

The interface faces the ground and can be more or less rounded. Therefore, the platform progressively gets farther from the ground moving from the interface 1F2 towards the rear part 1R of the vehicle. This fact improves the aerodynamic load of the car.

The angle formed between the front portion L1 and the rear portion L2 of the platform preferably ranges from 1 to 5 degrees and is preferably equal to 3 degrees.

The different structural layers LB2, LB3, etc. are all parallel to the rear portion L2 of the platform L. Therefore, the rear portion L2 of the platform L defines a first structural layer supporting some electric batteries.

According to a preferred aspect of the invention, the structural columns CL are vertical when the vehicle is in running order. This implies that a non-perpendicular angle is formed between the structural columns CL and the rear part L2 of the platform L.

This turns out to be very advantageous in use, since the columns can have been designed to work in a vertical position and, therefore, they keep doing so even when they are associated with a platform that is not horizontal, such as the rear portion L2 of the platform L.

During the assembly of the base 2, the platform L is placed on a complementary jig, which supports it keeping it oriented in the space in the same operating conditions of when it is operatively associated with the frame of the vehicle. Advantageously, the columns must be mounted with a vertical orientation V, with indisputable advantages during the assembly thereof and, in general, of the support frame TS of the batteries.

FIG. 4 shows in detail the support frame TS defining the rear battery pack BT2.

It comprises base fastening elements C1 having an almost cylindrical shape. They are rotation solids having an upper base, which is perpendicular to the rotation axis, and a lower base, which forms an angle with the rotation axis that is almost perpendicular. In other words, the lower base of the base fastening elements C1 makes up for a non-horizontal arrangement of the rear portion L2 of the platform L.

If said portion forms a 3 degree angle relative to the first portion L1 of the platform L, then the lower base is perpendicular to its rotation axis at less than 3 degrees, which means that it forms a 93 degree angle and an 87 degree angle corresponding to the alpha and beta angles shown in FIG. 4b.

The columns CL are fitted on the fastening elements C1.

The different layers LB2, LB3, etc. preferably consist of plates FL2, FL3, FL4 of metal material where suitable machining operations are carried out or, through founding, suitable seats CX are obtained, where the opposite ends CL1 and CL2 of the columns CL are inserted. Said seats are designed so that the layers LB2, LB3, etc. are parallel to the rear portion L2 of the platform L, optimizing a distribution of the forces and a better heat exchange.

Therefore, different support layers LB2, LB3 are obtained, which have the columns CL operatively in a vertical position, whereas the different structures FL2, FL3 are transverse elements, which are always parallel to the rear portion L2 of the platform.

In other words, each column has a first male end CL1 and a second female end CL2 opposite the first end.

With reference to FIG. 4b, the male end of a column is inserted, for example by means of a threaded coupling, into the female end of another column or, with reference to FIG. 4a, into the base fastening element C1.

When the male end of a column is inserted into the female end of another column, it clamps, in a sandwich-like configuration, a plate PL2, PL3, etc., thus defining one single body which includes two columns and a plate.

The plate has seats CX having opposite horizontal faces, namely faces that form an angle of +3 and −3 degrees, respectively, relative to the plane of the plate.

In other words, the supplementary alpha and beta angles differ, in absolute value, by twice the inclination of the rear part of the platform relative to a horizontal plane.

The columns have an oblong shape, preferably a cylindrical shape. Therefore, the ends CL1 and CL2, thanks to the seats CX, have an ideal peripheral adhesion to the seats, thus avoiding the formation of hinge nodes.

Thanks to this technical solution, a large contact surface is defined between the vertical columns and the seats CX, thus allowing for a particularly rigid support frame TS, besides optimizing heat exchanges among the different layers of batteries, the columns CL and the rear part L2 of the platform.

According to a preferred variant of the invention, the columns CL are obtained from an extruded tubular—preferably cylindrical—section bar, at whose opposite ends there are inserted a male plug and a female plug, which substantially coincide with the aforesaid opposite ends CL1 and CL2 of a column CL.

FIG. 5 shows the base 2 of the electric or hybrid car according to the invention in relation to the front axle WF and the rear axle WR. FIG. 6 shows a view from the top II of the assembly shown in FIG. 5.

For an easier understanding of the parts, the layers LB2, LB3, etc. are represented in a transparent manner. Alternatively, when the batteries consist of autonomous modules with relative casings, the layers LB2, LB3, etc. can be peripheral frames rather than plates, with an overall lightening of the support frame TS.

The figures show protection frames BF1 and BF2, namely a front and a rear protection frame, respectively, which are associated with the upper face of the front portion L1 and of the rear portion L2 of the platform L, respectively. This frames peripherally surround the base 2. They are preferably obtained from a box-shaped element with a rectangular cross section, which is properly shaped in order to follow the perimeter of the front portion and of the rear portion of the platform L.

The rear portion L2 houses two oblique side members SBR, which, from the rear part of the vehicle, converge towards a central portion CTRN, which, according to the description below, is a central node where different structural elements of the vehicle frame converge.

The term "oblique" is clear when taking into account a longitudinal development axis Z of the car.
All the side members described herein preferably have a longitudinal shape preferably obtained by means of a tubular element with a square or rectangular cross section and made of a high-resistance material.

Unlike the other structural elements converging in the central node CTRN, which are described below, the oblique side members SBR are manufactured as one single piece together with the base 2.

Figure 7:
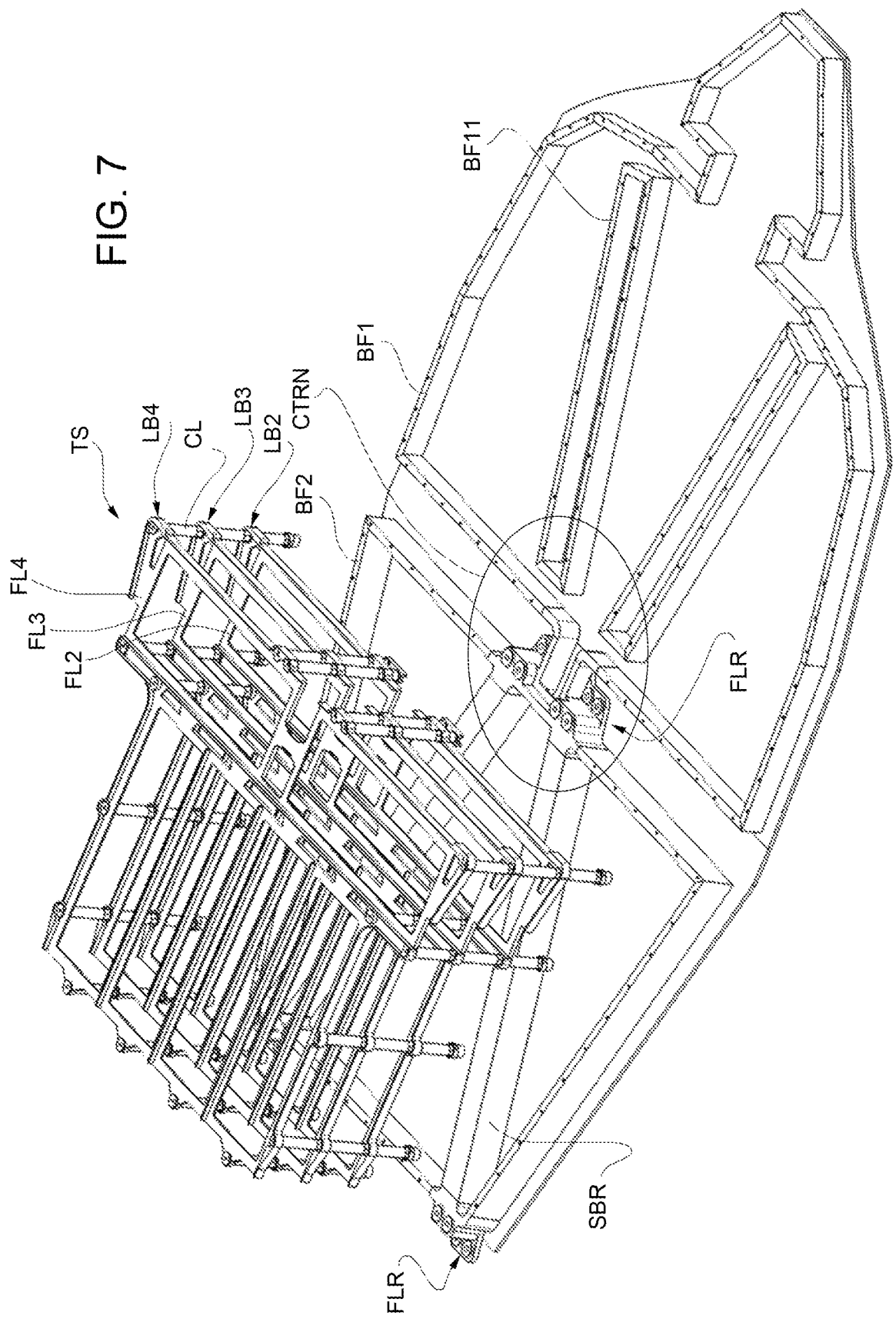
FIG. 7 shows an exploded view according to a perspective view of an exploded view of the floor of FIG. 3.

In other words, the base 2 basically comprises the platform L (L1, L2), on whose upper surface the protection frames BF1 and BF2 are applied, the oblique side members SBR and the battery support frame TS, according to the exploded view of FIG. 7. The base 2 also comprises, in order to be complete, proper covers described below.

Figure 10:
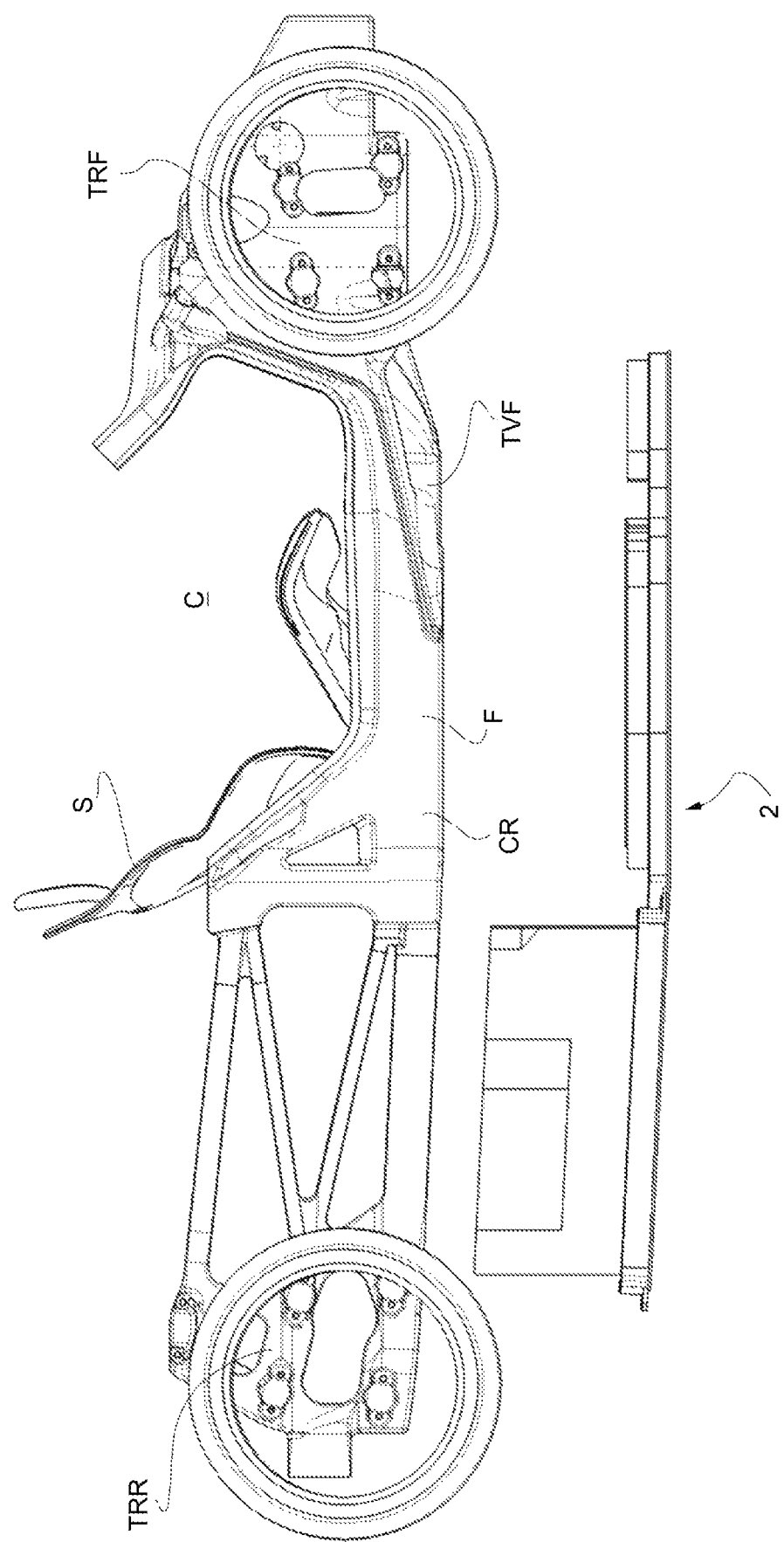
FIG. 10 shows a side view of the car of the preceding figures with specific reference to the relative frame, during an insertion or an extraction of a relative floor.

Therefore, when the base 2 is associated with the remaining frame F of the vehicle, from underneath, according to FIG. 10, the rear oblique side members are selectively connected to the remaining frame by means of suitable flanges. In particular, there are rear flanges FLR and front flanges FLF.

The different oblique side members, both the front ones and the rear ones, are preferably obtained from box-shaped elements with a rectangular cross section.

The rear flanges are going to be fixed close to a particularly rigid portion of the frame commonly known as "rear tower", namely a rear turret TRR to which a rear suspension (not shown) is fixed.

The turrets usually are sturdy metal components extending vertically, which is why they are called towers or turrets.

The front flanges, on the other hand, are going to be fixed to the aforesaid central node.

The frames BF1 and BF2 preferably converge in said central node as well, thus increasing the stiffening of the structure.

FIGS. 6 and 7 also show inner frames BF11 associated with the front part L1 of the platform L. These frames are used to surround, when the base is applied to the car, front oblique side members SBF, which, unlike the rear ones SBR, are manufactured as one single piece together with the frame F of the vehicle.

FIG. 6 shows, in plan view, the platform with the relative frames. FIG. 6a shows a portion of FIG. 6 representing the cylindrical batteries BTC. These batteries are arranged so that a relative symmetry axis is perpendicular to the platform, namely to a plane on which the floor of the car lies.

Support elements are provided, though not shown, which, for example are made of a plastic material, which occupy the entire volume defined by the intersection of the structural elements, such as side members and beams, which, by intersecting one another, help define one of the triangular structures inserted in the floor of the car.

The cylindrical shape of the single cells is particularly advantageous to occupy all the space available.
This perfect complementarity is evident from FIG. 8.

Document EP3264497A1 shows a support and electric connection system for a plurality of cylindrical batteries packed together by means of two half-shells, which cover the upper end and the lower end, respectively, of the plurality of cylindrical cells.

These half-shells are preferably shaped so as to be perfectly framed in the frames BF1, so as to fill the entire space available, as shown, in particular, in FIG. 6a.

Claim 1 of EP3264497A1 is included herein for reference.

The fact that the batteries housed in the floor are cylindrical does not imply that the rear battery pack BT2 also consists of cylindrical batteries. Indeed, according to FIG. 7, the volume occupied by the rear battery pack is more regular and, therefore, the battery modules can have the shape of a parallelepiped and, furthermore, all types of cells, namely cylindrical, prismatic or pouch cells, can be adopted. This is particularly advantageous when two battery packs with different capacities and a different C-rate are needed, wherein the C-rate is given by the ratio between the deliverable power and the storage capacity of each cell.

Figure 11:
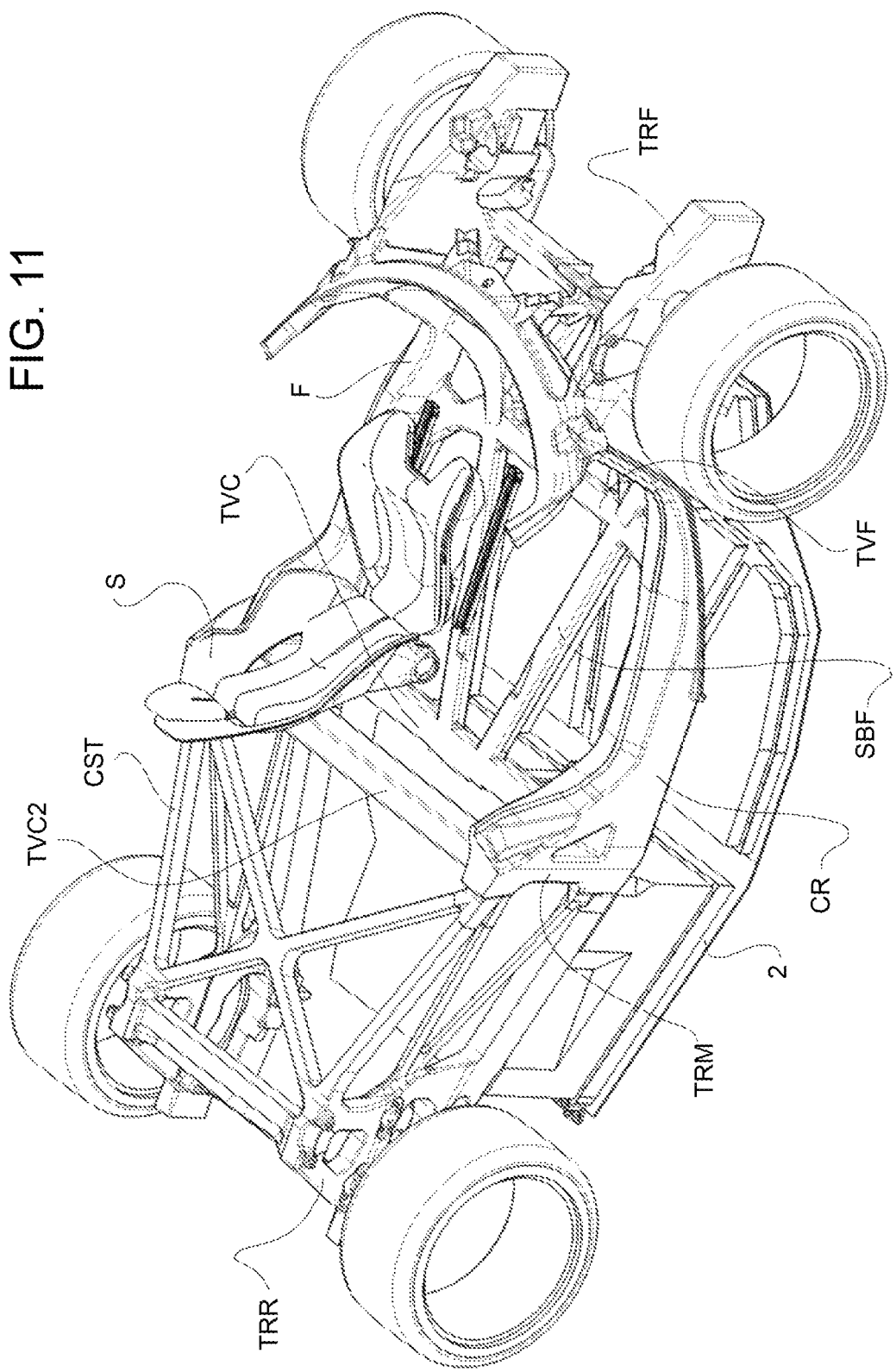

To this regard, FIG. 11 shows the frame F of the vehicle with the base exploded underneath and the front oblique side members SBF.

FIG. 8 shows, according to the same angle as FIG. 7, the complete base 2.

The rear battery pack BT2 is covered by a cover made of a proper material, which encloses, on the inside, the entire battery pack BT2, striking against the rear protection frame BF2.

The front battery pack substantially consists of three portions, a central portion and two lateral portions, enclosed inside respective covers CV11, CV12 and CV13.

In this case, again, the three covers of the front battery pack strike against the front protection frame BF1 peripherally surrounding the front part of the platform. Therefore, two oblique longitudinal grooves CO are defined, which converge from the front part of the vehicle towards the aforesaid central node CTRN.

A further longitudinal groove is defined between the front battery pack BT1 and the rear battery pack.

These grooves are complementary to elements of the frame, among which there are the front oblique side members SBF visible in FIG. 11.

Figure 9A:
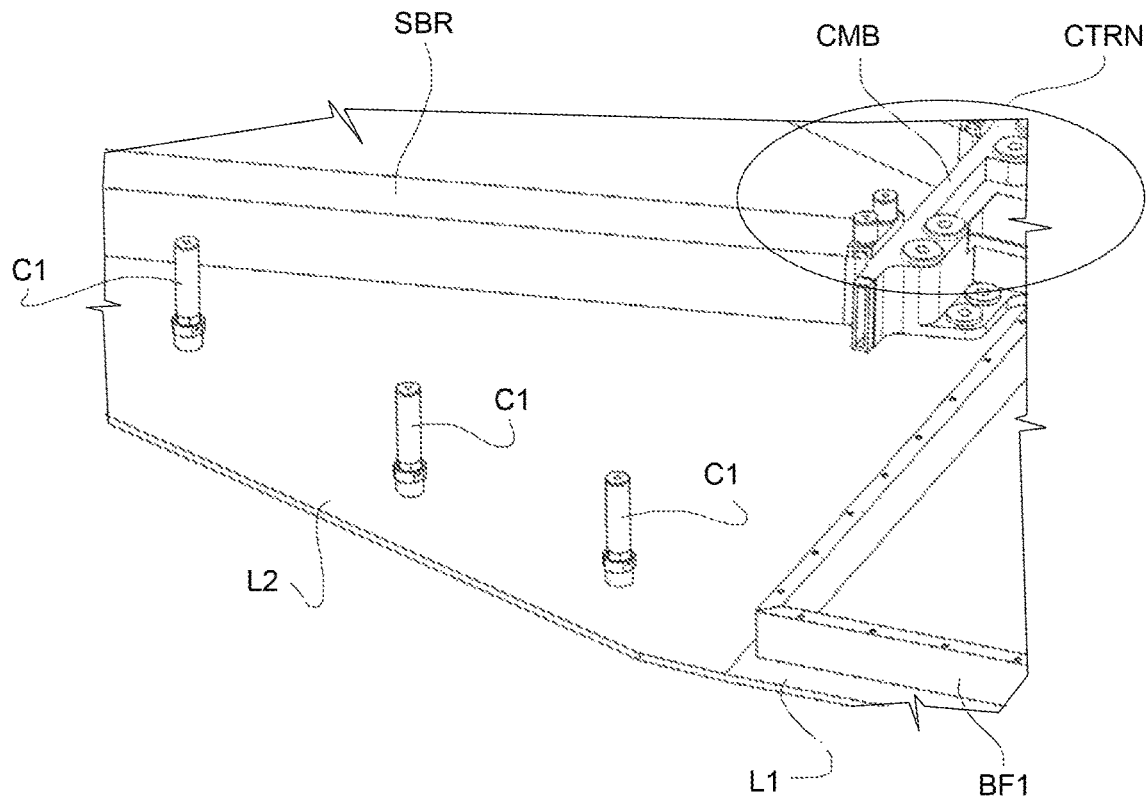

FIG. 9a shows a portion of the base 2 highlighting the rear portion L2 and the front portion L1 of the platform L.

The rear frame BF2 is not shown for a better understanding of the drawing. This figure shows that the central node at least partially consists of a central connection element CMB, which is directly connected to the rear oblique side members SBR, to the rear portion L2 and to the front portion L1 of the platform L; the front protection frame BF1 and the rear protection frame BF2 also converge towards said element.

Figure 9B:
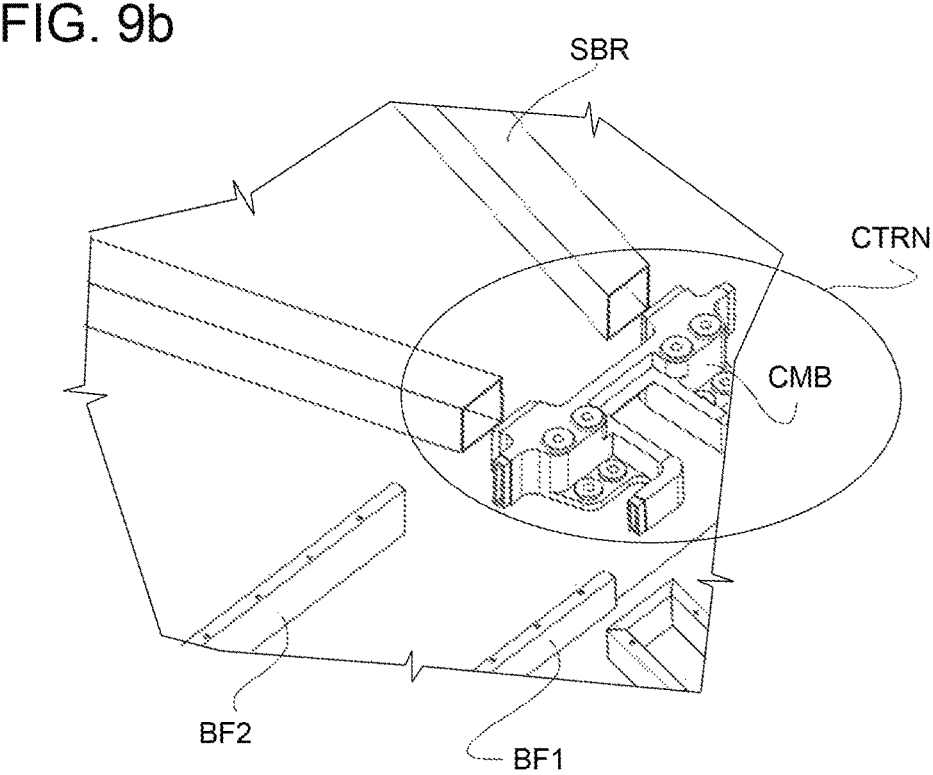

FIG. 9b shows an exploded view of the central area of the base 2.

It shows how the central connection element CMB acts like a flange connecting the base 2 to the remaining frame F of the motor vehicle, for example by means of bolts and screws. From the top, it is substantially shaped like a pi, with the rear oblique side members SBR and the rear protection frame BF2 converging towards the upper part, whereas the front protection frame BF1 is connected to the legs of the pi.

FIG. 9c shows details of exploded portions of the base 2. Two connection elements RN, which are similar to the central element CMB, are provided also for the rear holding, but they are arranged in the area of the rear ends of the rear oblique side members. In this case, the rear connection elements RN are going to be assembled with the rear protection frame BF2, the rear oblique side members and the rear portion of the platform L2.

Just like the central connection element CMB, they define flanges for fixing the base to the remaining frame through bolts.

Figure 14:
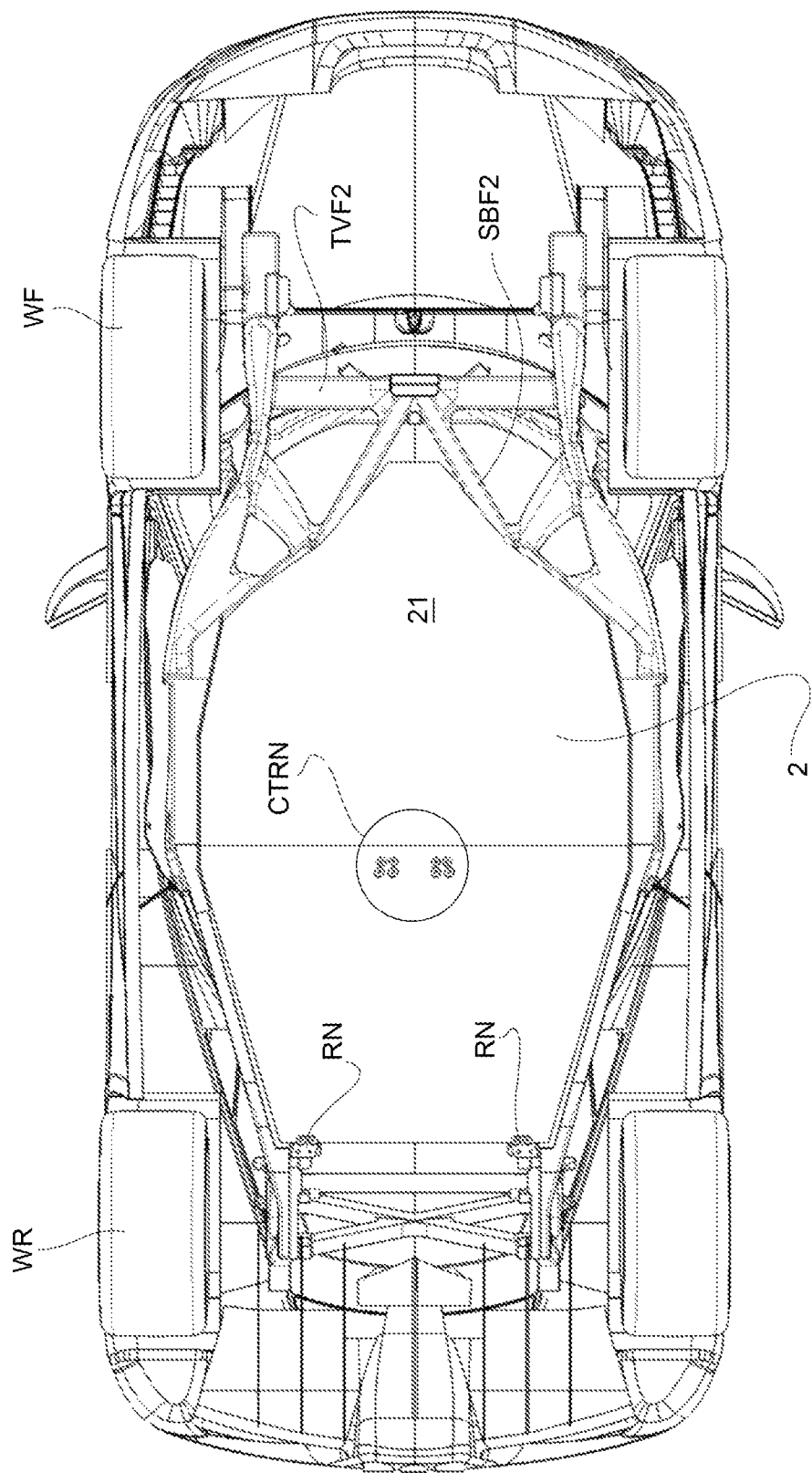

It is clear that the edges of the base 2 are going to be connected to the remaining frame by means of suitable screws, but it is also clear that the rear oblique side members SBR, since they have to interact with the frame, as they are part of it, when the base 2 is associated with the remaining frame, require large-sized screws and bolts, as you can see in the view from the bottom of the vehicle of FIG. 14.

FIG. 9d shows an exploded assembly of the base 2, where the support frame TS is not shown, so as to better understand the multitude of joints created between the elements defining the protection frame and the mounting elements CMB and RN as well as between the latter and the rear oblique side members.

Figure 12:
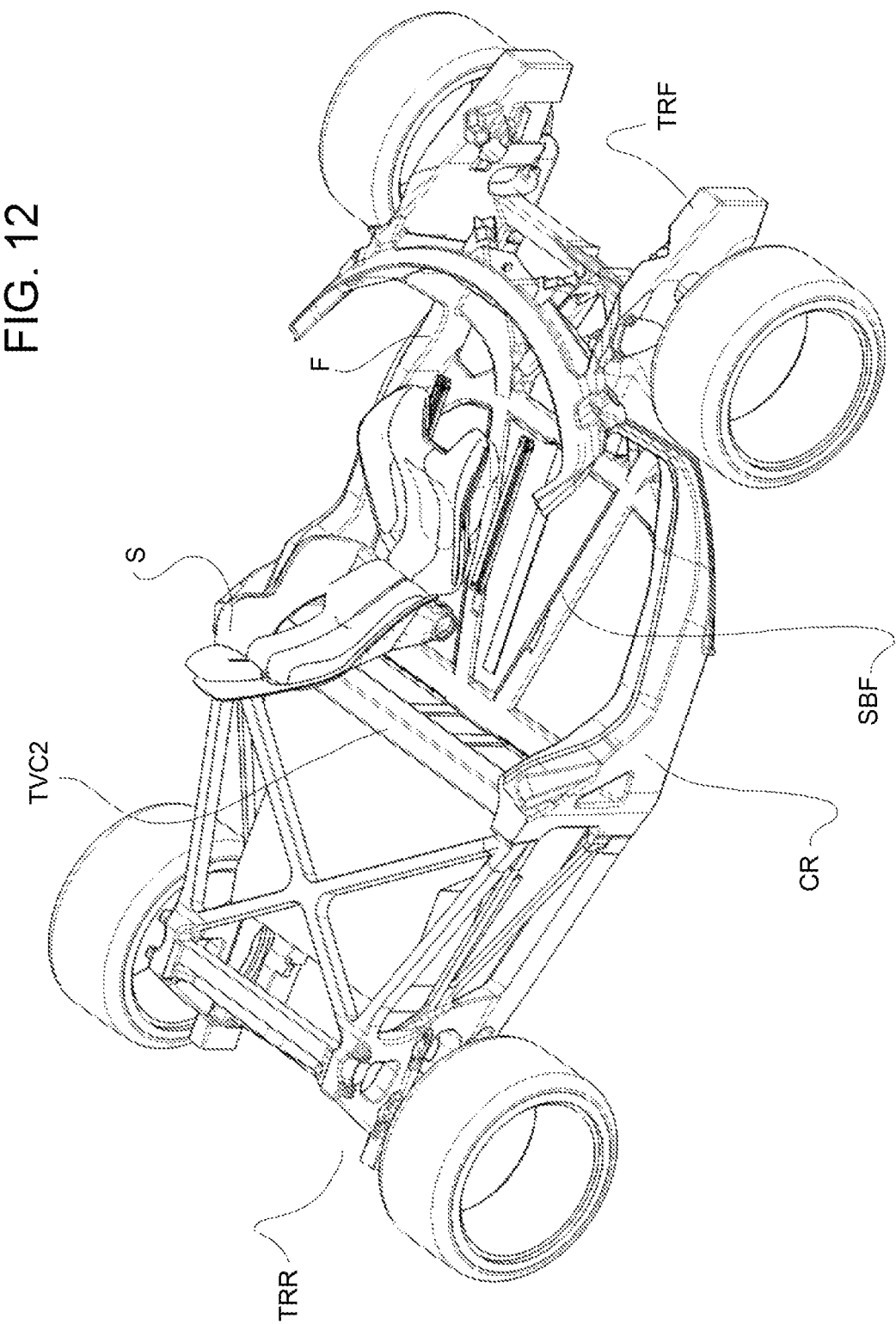
FIG. 12 shows the same perspective as FIG. 11, wherein the floor is associated with the frame of the car.

With reference to FIGS. 10-12, the frame F of the car according to the invention is described with particular reference to the floor of the frame. As already mentioned above, it consists of a fixed portion of the frame, which cannot be removed. It comprises a cradle CR, which laterally surrounds the floor FL of the cabin C and comprises a front beam TVF, which extends from one side to the other of the vehicle between the driver's seat and the control pedals of the vehicle, and a central beam TVC, which extends from one side to the other of the vehicle and is arranged immediately behind or under the seat S.

Said front and central beams intersect the cradle CR at their opposite ends.

The central beam is particularly useful to brilliantly pass crash tests, in particular the pole impact test.

In the area delimited by the cradle CR and by the beams TVF and TFC there is a pair of front oblique side members SBF, which converge towards a central area of the central beam TFC.

Therefore, the frame portion obtained in the floor comprises a set of structural triangles.

As disclosed above, the base 2, which represents a removable portion of the floor FL, includes a pair of rear oblique side members SBR, which are entirely integrated in the base and, hence, can be removed with it.

Said rear oblique side members SBR, once associated with the remaining frame F, make the frame portion integrated in the floor FL of the vehicle a planar set of triangular structures. As it is known, triangular structures are the most rigid and stable ones existing in nature. As a consequence, the floor is as rigid and stable as possible.

According to the figures, the central beam TVC preferably represents a symmetry axis for the front oblique side members relative to the rear ones.

Therefore, the entire frame portion integrated in the floor consists of a generally planar structural set of triangles both in the fixed and non-removable portion and in the rear removable portion of the floor, namely the base 2.

The rear oblique side members are part of the frame because they cooperate with it in order to absorb stresses transferred to the frame both by the suspension and by a possible impact against external objects.

Therefore, when the frame is sized by a computer, the rear oblique side members are considered as an integral part of the frame and not as simple additional elements supported by the frame.

Figure 13:
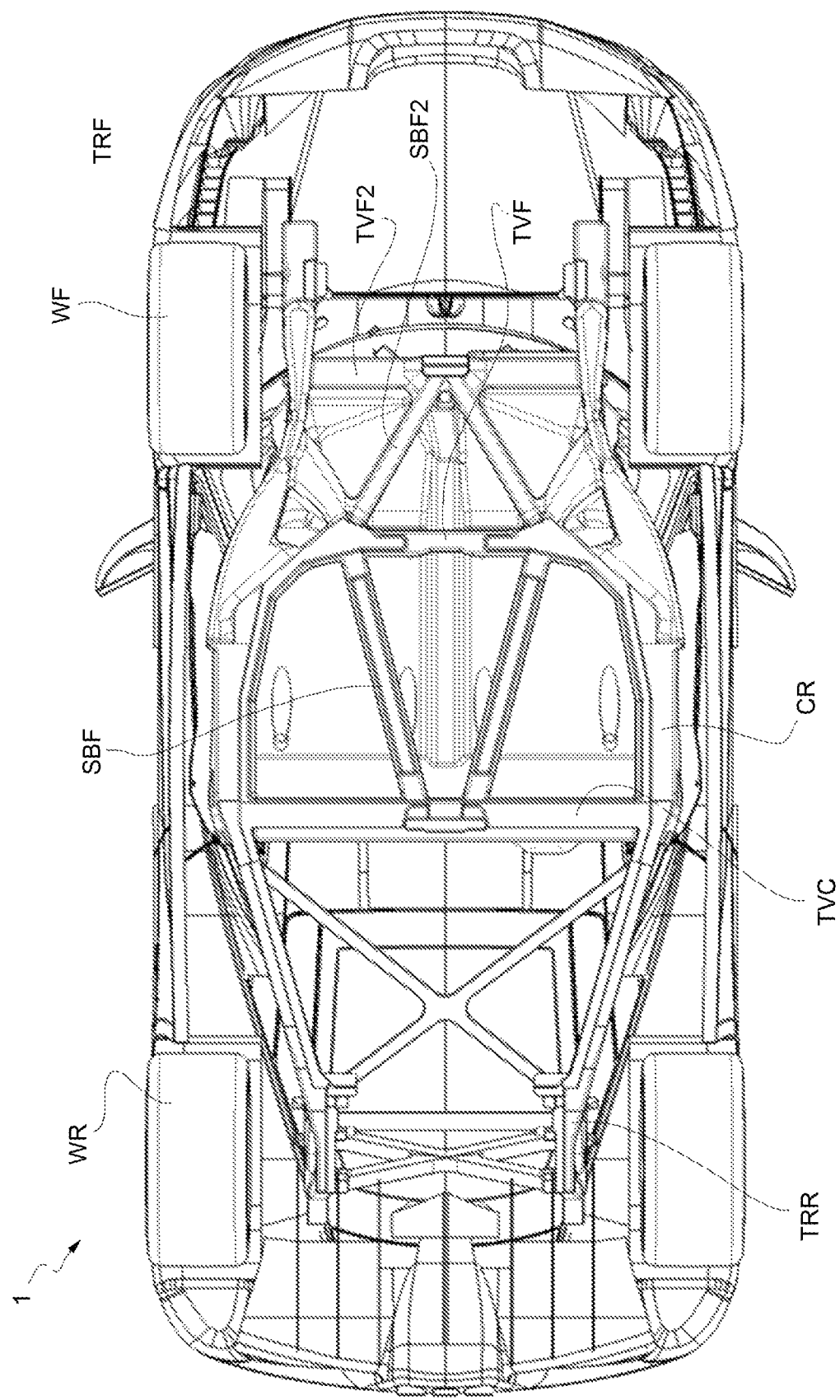
FIGS. 13 and 14 show two views from the bottom of the same car as the preceding figures with a removed floor and with a floor associated with the vehicle frame, respectively.

FIG. 13 shows a view from the bottom of the electric motor vehicle 1. It evidently is, with the comparison with FIG. 1, a sports car, since it is low relative to the respective longitudinal and transverse development.

In this case, the cabin is particularly elongated. Therefore, there can be a forward extension of the floor, which involves a further front beams TVF2.

The middle line of said further front beam TVF2 is interconnected to the front beam TVF by means of further oblique side members SBF2, which start from said middle line in order to be connected to the front beam TVF approximately in the points of connection of the front oblique side members SBF.

Said further front beam TVF2 is connected, at the opposite ends, to the front turrets TRF supporting the front suspensions.

As to the portion of the frame at the back relative to the cabin C, the cradle CR closes in the area of the central beam TVC with intermediate turrets TVM arranged on both sides of the vehicle.

These turrets not only help stiffen the cabin, but also support further structural elements.

In particular, the upper part of the intermediate turrets is interconnected to an upper central beam TVCS, which is parallel to the central beam TVC and is evidently arranged above the plane of the floor FL.

A latticed structure is created between the intermediate turrets TRM and the rear turrets TRR, to which the rear suspensions of the vehicle are fixed, said latticed structure always being a structural set of triangles, hereinafter referred to as staging CST.

Said latticed structure has, in plan view, the shape of a quadrilateral and, in the space, it has the shape of a possibly right prism so as to simplify the operations for the connection of the base 2 to the remaining vehicle frame.

Therefore, there are an open lower base and an upper base, in which two diagonals joining the intermediate turrets to one another are arranged.

Hence, the floor FL and, in general, the entire vehicle frame are highly rigid and safe.

The invention claimed is:

1. An electric or hybrid sport car (1) comprising a vehicular frame (F) and a floor (FL) formed by a fixed portion with the vehicular frame and a removable base (2) and wherein a bottom part of the base consists of a so-called platform (L), that consists of a plate made of metal or high resistance composite material, exposed to the outside so as to operatively face the ground on which the car rests, and wherein the base comprises a front part (21) and a rear part (22) respectively comprising a front part (L1) and a rear part (L2) of the platform and wherein between said front part and rear part of the platform an angle smaller than a flat angle is formed, so that said rear part of the platform diverges from the ground proceeding towards a rear part (1R) of the car, and wherein said rear part (22) of the platform supports a support frame (TS) of a rear battery pack (BT2), and wherein said support frame comprises a plurality of support layers (LB1, LB2, LB3, . . . ) for as many battery layers, that include columns (CL) operatively vertical and structures parallel to the rear portion (L2) of the platform.

2. The car according to claim 1, wherein each of said columns are fixed to said rear portion (L2) of the platform by means of base fastening elements (C1) configured to compensate an inclination of said rear portion (L2) of the platform.

3. The car according to claim 2, wherein said fastening element (C1) has an almost-cylindrical shape, being a solid of revolution having a top base perpendicular to the rotation axis and a bottom base that forms an angle with the almost-perpendicular rotation axis adapted to compensate said inclination of said rear portion of the platform.

4. The car according to claim 1, wherein each column has a first male end (CL1) and a second female end (CL2) opposite to the first end and wherein said frame is made by inserting a male end of a column in a female end of another column or in said fastening element (C1).

5. The car according to claim 4, wherein when the male end of a column is inserted, in the female end of the other column, it adheres to a plate (FL2, FL3, etc.) in a sandwich configuration, defining one of said structures, thus achieving a single body that includes two columns and a plate.

6. The car according to claim 5, wherein each of said structures (F12, F13, F14) comprises at least a pair of horizontal opposite seats (CX), having shapes that are complementary to the opposite ends (CL1, CL2) of said adhering glues in a sandwich configuration.

7. The car according to claim 1, wherein said support frame (TS) is shaped to adhere, in a sandwich configuration, to two oblique rear side members (SBR) between the frame and said rear portion of the platform, said two rear side members converging from the rear part of the vehicle towards a central portion (CTRN).

8. The car according to claim 7, wherein each of said rear side members has a longitudinal shape and connection elements (CMB, RN) are associated with each opposite end of each side member for firmly connecting said rear side members to said vehicular frame (F) thus becoming a part of the frame.

9. The car according to claim 1, wherein said vehicular frame comprises a cradle (CR) that surrounds the floor (FL) at a cabin (C) and comprises a front beam (TVF) that extends from one side of the vehicle to the other between a guide seat (S) and vehicle control pedals and a central beam (TVC), that extends from one side of the vehicle to the other, arranged immediately at the shoulders or below said seat (S).

10. The car according to claim 9, wherein said cradle (CR) closes at said central beam (TVC) with intermediate turrets (TVM) arranged on both sides of the vehicle, wherein said intermediate turrets help to strengthen the cabin and offer support to further structural elements.

11. The car according to claim 10, wherein the top part of the intermediate turrets is interconnected with an upper central beam (TVCS), parallel to the central beam (TVC) and arranged above the plane of the floor (FL) and wherein the frame comprises a pair of rear turrets (TRR) adapted to support a relative suspension and wherein a latticed structure is achieved between the intermediate turrets (TRM) and the rear turrets (TRR).

12. The car according to claim 11, wherein said latticed structure has a quadrilateral shape in plan, and in the space has a prism shape, possibly a right prism shape, that simplifies connection operations of the base (2) to the remaining vehicular frame (F).

* * * * *